Patented Apr. 29, 1930

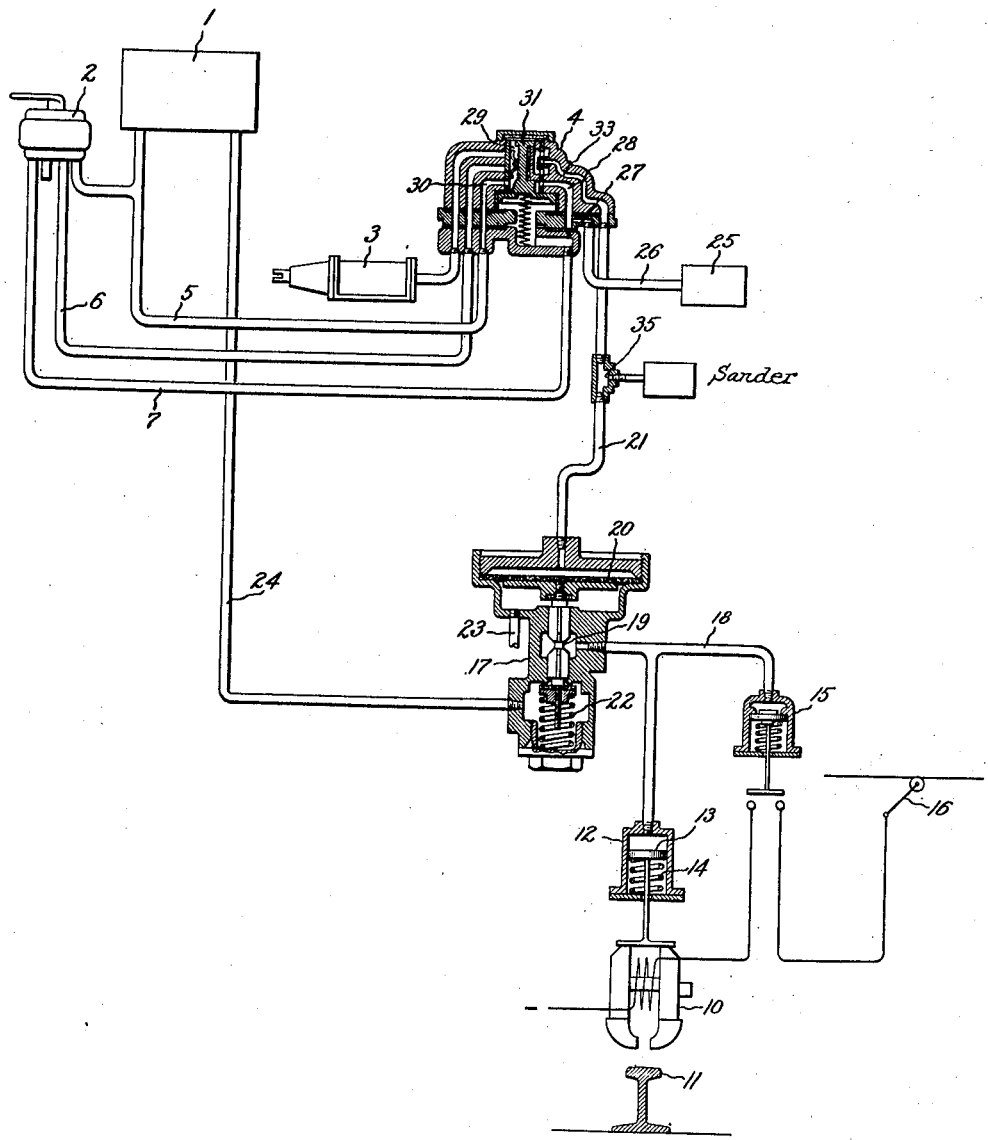

1,756,921

UNITED STATES PATENT OFFICE

CHARLES A. IVES AND GEORGE MACLOSKIE, OF ERIE, PENNSYLVANIA, ASSIGNORS TO GENERAL ELECTRIC COMPANY, A CORPORATION OF NEW YORK

BRAKE SYSTEM

Application filed September 28, 1926. Serial No. 138,159.

Our invention relates to brake systems, and particularly to a combined wheel and track brake system.

In order to stop cars more quickly, it has been proposed heretofore to use magnetic track brakes in conjunction with the ordinary air brakes for the car wheels and to arrange the magnetic track brakes so that normally they are deenergized and are carried out of engagement with the track, and automatically are moved into engagement with the track and energized when a predetermined application of the air brakes is made.

One object of our invention is to provide an improved braking system of this general character. In accordance with our invention, we provide means for energizing the magnetic brakes for a predetermined time after they have been brought into engagement with the track, which makes it possible to secure a maximum braking effect from the magnetic brakes without danger of overheating. Also we preferably provide means for insuring the return of the magnetic brakes to their normal position above the track when the magnetic brakes are deenergized.

Our invention also includes other features which will be discussed in detail hereinafter.

While our invention is applicable to various types of wheel brakes, in the accompanying drawing, which is a diagram of a combined air brake and track brake system embodying our invention, we have shown our invention in connection with a well known type of straight air brake system with emergency feature. This air brake system comprises a main reservoir 1, a brake valve 2, a brake cylinder 3, and emergency valve 4, a main reservoir pipe 5, a straight air pipe 6 and an emergency pipe 7. As is well known in the art, the emergency valve 4 is normally maintained in the position shown in the drawing in which position the straight air pipe 6 is in communication with the brake cylinder 3. A straight air application of the brakes therefore may be effected by moving the brake valve 2 so that it establishes communication between the main reservoir pipe 5 and the straight air pipe 6, and the brakes may be released by moving the brake valve 2 so that it establishes communication between the straight air pipe 6 and atmosphere. The emergency valve 4, which may be of any suitable type, examples of which are well known in the art, is also arranged when pressure in the emergency pipe 7 is reduced at a rapid rate to close communication between the brake cylinder 3 and the straight air pipe 6, and to open communication between the brake cylinder 3 and the main reservoir pipe 5 so as to effect an emergency application of the brakes.

The magnetic track brake system comprises a magnetic track brake 10, which may be of any suitable construction, examples of which are well known in the art. Preferably, the brake is normally carried out of operative relation with the track 11 so that there is sufficient clearance to prevent small articles that may be on the track from being caught between the track and the brake. Any suitable means may be provided for moving the track brake into and out of operative relation with the track. As shown in the drawing, a fluid pressure cylinder 12 containing a piston 13, secured to the brake 10, and an opposing spring 14, is provided for this purpose. A fluid pressure operated switch 15, which may be of any suitable construction, examples of which are well known in the art, is also provided for controlling the energizing circuit of the magnetic brake. The brake may be supplied with current from any suitable source of current. As shown in the drawing, the switch 15, when closed, connects the brake winding directly to the trolley 16.

In accordance with our invention, we provide an improved arrangement for effecting the operation of magnetic track brake 10 when a predetermined application of the air brake is made and an arrangement whereby the magnetic track brake is operated for only a predetermined length of time so as to prevent the winding of the magnetic brake from being damaged due to overheating which might result if it were left connected to the trolley indefinitely.

As disclosed in the drawing, the magnetic track brake 10 is arranged to be operated whenever an emergency application of the air brakes is made. This result is obtained by means of a fluid operated relay valve 17 of any suitable construction which is operated for a certain length of time when an emergency application of the brakes is made to establish communication between a pipe 18 through which fluid pressure is supplied to the cylinder 12 and switch 15, and a suitable source of fluid pressure, which is shown in the drawing as the main reservoir 1. As shown, the relay valve 17 comprises a double beat valve 19, which is adapted to be operated by a diaphragm 20, one side of which is subject to the pressure in a pipe 21 leading to the emergency valve 4. When there is no fluid pressure in the pipe 21, the double beat valve 19 is held in the position shown in the drawing by a spring 22 so that it establishes communication between the pipe 18 and a pipe 23 leading to atmosphere. When, however, fluid pressure is supplied to the pipe 21, the diaphragm 20 is moved downwardly so that the double beat valve 19 is operated to close communication between pipe 18 and atmosphere and to establish communication between pipe 18 and pipe 24, which is connected to the main reservoir 1.

In order that fluid pressure may be supplied to the pipe 21 to effect the operation of the magnetic track brake 10 when an emergency application of the air brakes is made, the emergency valve 4 is arranged so that when it is in its normal position it connects an auxiliary reservoir 25 to the main reservoir pipe 5 by means of a pipe 26, passages 27 and 28, valve chamber 29, and passage 30 so that the auxiliary reservoir 25 is normally charged with fluid pressure. When the emergency valve 4 is in its emergency position its slide valve 31 closes communication between passage 28 and the valve chamber 29 and establishes communication between passage 28 and passage 33 which leads to the pipe 21 so that the fluid pressure in the auxiliary reservoir 25 is supplied to the pipe 21.

In order that the track brake will remain operated for only a predetermined time, the pipe 21 is provided with a relatively small opening 35 to atmosphere so that after a predetermined time the fluid pressure in the auxiliary reservoir becomes exhausted and the relay valve 17 is restored to its normal position by the spring 22. If desirable the fluid pressure that escapes through the opening 35 may be used for any suitable purpose such as operating a sander to sand the track.

The operation of the arrangement shown is as follows: Whenever an emergency application of the air brakes is made so that the emergency valve 4 is moved into its emergency position, the slide valve 31 operates to disconnect the auxiliary reservoir 25 from the main reservoir pipe 5 and to establish communication between the auxiliary reservoir 25 and the pipe 21. As soon as the fluid pressure in the pipe 21 builds up to a predetermined value the diaphragm 20 of the relay valve 17 moves downwardly so that the double beat valve 19 is operated to close communication between the pipes 18 and 23 and to open communication between pipes 18 and 24. Therefore fluid pressure is supplied from the main reservoir 1, through pipes 24 and 18 to the cylinder 13 and the pneumatic switch 15 so that the magnetic track brake 10 is moved into operative relation with the track 11 and is supplied with current from the trolley 16.

After a predetermined time, which is determined by the size of the opening 35, the amount of fluid pressure in the auxiliary reservoir and pipe 21 becomes insufficient to maintain the relay valve 17 in its operative position. The spring 22 then restores the relay valve 17 to its normal position in which position communication is established between pipe 18 and exhaust pipe 23 so that the magnetic track brake 10 is deenergized and is moved out of operative relation with the track.

As soon as the emergency valve 4 is restored to its normal position the auxiliary reservoir 25 is reconnected to the main reservoir pipe 5 and is recharged with fluid pressure.

While we have in accordance with the patent statutes shown and described our invention as applied to a particular system and as embodying various devices diagrammatically indicated, changes and modifications will be obvious to those skilled in the art and we therefore aim in the appended claims to cover all such changes and modifications as fall within the true spirit and scope of our invention.

What we claim as new, and desire to secure by Letters Patent of the United States, is:

1. In combination, an air brake system, a track brake, and means for effecting the operation of the track brake for a predetermined length of time when an application of the brakes of the air brake system is made.

2. In combination, an air brake system, a track brake normally out of operative relation with the track, and means for effecting the movement of said track brake into operative relation with the track and for maintaining it in operative relation therewith for a predetermined length of time when an application of the brakes of the air brake system is made.

3. In combination, an air brake system, a source of fluid pressure, fluid pressure operated switching means, a magnetic track brake, and means operative when an application of the brakes of said air brake system is made to establish communication between said source and said switching means whereby said means is operated to effect the energization of said magnetic track brake.

4. In combination, an air brake system, a source of fluid pressure, a magnetic track brake normally out of operative relation with the track, fluid pressure operated means for moving said brake into operative relation with the track, and means for establishing communication between said source and said fluid pressure operated means when an application of the air brakes is made whereby said fluid pressure operated means is operated to effect the movement of said magnetic track brake into operative relation with the track.

5. In combination, an air brake system, a source of fluid pressure, a magnetic track brake normally out of operative relation with the track, fluid pressure operated means for controlling the energization of said brake and the movement of said brake into operative relation with the track, means arranged to be operated when an application of the brakes of the air brake system is made to control communication between said source and said fluid pressure operated means whereby said means is operated to effect the movement of said magnetic track brake into operative relation with the track and the energization of said magnetic track brake for a predetermined length of time.

6. In combination, an air brake system comprising an emergency pipe and an emergency valve arranged to effect an application of the air brakes when the fluid pressure in said emergency pipe decreases below a predetermined value, a fluid pressure reservoir, a magnetic track brake, fluid pressure operated means adapted to effect the energization of said magnetic track brake, and means controlled by said emergency valve for establishing communication between said reservoir and said fluid pressure operated means and for venting fluid from said reservoir whereby said fluid pressure operated means is operated to effect the energization of said magnetic track brake for a predetermined length of time when an emergency application of the air brakes is made.

7. In combination, an air brake system comprising an emergency pipe and an emergency valve arranged to effect an application of the air brakes when the fluid pressure in said emergency pipe decreases below a predetermined value, a fluid pressure reservoir, a magnetic track brake normally out of operative relation with the track, fluid pressure operated means adapted to effect the movement of said track brake into operative relation with the track, means controlled by said emergency valve for establishing communication between said reservoir and said fluid pressure controlled means and for venting fluid from said reservoir whereby said fluid pressure operated means is operated to move said track brake in operative relation with the track and to maintain it in operative relation therewith for a predetermined length of time when an emergency application of the brakes is made, and means for energizing said track brake.

8. In a combined fluid pressure and track brake system, a main reservoir, an emergency valve, an auxiliary reservoir normally arranged to be supplied with fluid pressure from said main reservoir, a magnetic track brake, a fluid pressure operated switch for controlling the energization of said track brake, a relay valve arranged to control communication between said main reservoir and said fluid pressure operated switch, and means controlled by said emergency valve for controlling communication between said auxiliary reservoir and said relay valve and between said auxiliary reservoir and atmosphere when said emergency valve is operated to effect an emergency application of the brakes whereby said magnetic track brake is energized for a predetermined length of time.

9. In a combined fluid pressure and track brake system, a main reservoir, an emergency valve, an auxiliary reservoir normally arranged to be supplied with fluid pressure from said main reservoir, a track brake normally out of operative relation with the track, fluid pressure operated means for moving said brake into operative relation with the track, a relay valve arranged to control communication between said main reservoir and said last mentioned means, and means controlled by said emergency valve for controlling communication between said auxiliary reservoir and said relay valve and between said auxiliary reservoir and atmosphere when said emergency valve is operated to effect an emergency application of the brakes whereby said track brake is maintained in operative relation with the track for a predetermined length of time.

10. In combination, an air brake system, a source of fluid pressure, a magnetic track brake normally out of operative relation with the track, fluid pressure operated means for effecting the energization of said magnetic track brake and the movement thereof relatively to the track, and a relay valve controlled by the fluid pressure in said air brake system for establishing communication between said source of fluid pressure and said fluid pressure operated means in response to a predetermined application of the air brakes whereby an application of the magnetic track brake is effected.

11. In combination, an air brake system, a source of fluid pressure, a magnetic track brake normally out of operative relation with the track, fluid pressure operated means for effecting the energization of said magnetic track brake and the movement thereof relatively to the track, a relay valve having one position in which communication is established between said fluid pressure operated means and atmosphere and another position in which said communication to atmosphere is cut off and communication is established between said source of fluid pressure and said fluid pressure operated means, fluid pressure operated means for operating said relay valve, and means for controlling the supply of fluid pressure to said last mentioned fluid pressure operated means to effect the movement of said relay valve from one position to another.

In witness whereof, we have hereunto set our hands this 25 day of Sept., 1926.

CHARLES A. IVES.
GEORGE MACLOSKIE.